(12) United States Patent
Meare (10) Patent No.: US 8,831,399 B2
(45) Date of Patent: Sep. 9, 2014

(54) SYSTEMS AND METHODS FOR MANAGING AND IDENTIFYING THE ORIGIN OF FILES ON A DIGITAL VIDEO RECORDER

(75) Inventor: David Meare, Royton (GB)

(73) Assignee: Eldon Technology Limited, Keighley (GB)

( * ) Notice: Subject to any disclaimer, the term of this patent is extended or adjusted under 35 U.S.C. 154(b) by 732 days.

(21) Appl. No.: 12/631,923

(22) Filed: Dec. 7, 2009

(65) Prior Publication Data

US 2011/0135281 A1 Jun. 9, 2011

(51) Int. Cl.
*H04N 5/76* (2006.01)

(52) U.S. Cl.
USPC .......................................... 386/234; 386/291

(58) Field of Classification Search
USPC .................................. 386/291, 295, 292, 234
See application file for complete search history.

(56) References Cited

U.S. PATENT DOCUMENTS

| | | | |
|---|---|---|---|
| 7,394,967 B1 * | 7/2008 | Potrebic et al. | 386/248 |
| 7,403,692 B2 * | 7/2008 | Son | 386/291 |
| 7,505,671 B2 * | 3/2009 | Hagiwara et al. | 386/291 |
| 7,519,627 B2 * | 4/2009 | Malloy | 1/1 |
| 2002/0138830 A1 * | 9/2002 | Nagaoka et al. | 725/14 |
| 2003/0033610 A1 * | 2/2003 | Takatori | 725/133 |
| 2003/0159146 A1 * | 8/2003 | Kim | 725/46 |
| 2004/0006698 A1 * | 1/2004 | Apfelbaum | 713/182 |
| 2004/0091236 A1 | 5/2004 | Boston et al. | |
| 2004/0101271 A1 * | 5/2004 | Boston et al. | 386/46 |
| 2004/0244030 A1 * | 12/2004 | Boyce et al. | 725/25 |
| 2005/0213928 A1 * | 9/2005 | Candelore et al. | 386/46 |
| 2009/0010618 A1 | 1/2009 | Devlin | |
| 2009/0142036 A1 * | 6/2009 | Branam et al. | 386/83 |
| 2010/0014831 A1 * | 1/2010 | Nakano | 386/83 |
| 2011/0030018 A1 * | 2/2011 | Mizuno et al. | 725/88 |

FOREIGN PATENT DOCUMENTS

| | | | |
|---|---|---|---|
| GB | 2346251 A | | 8/2000 |
| JP | 2003-141851 | * | 5/2003 |
| JP | 2004235772 | * | 8/2004 |
| WO | WO 92/22983 | * | 12/1992 |
| WO | 2006075310 A1 | | 7/2006 |

OTHER PUBLICATIONS

Yamaguchi, Machine generated translation of JP 2003-141851, May 2003.*
The International Bureau of WIPO "International Preliminary Report on Patentability" mailed Jun. 21, 2012 for Intl. Patent Appln. No. PCT/EP2010/069108 filed Dec. 7, 2010.

* cited by examiner

*Primary Examiner* — David Harvey

(74) *Attorney, Agent, or Firm* — Ingrassia Fisher & Lorenz, P.C.

(57) ABSTRACT

Described herein are techniques for managing files of a digital video recorder. Responsive to a request to record content, a DVR identifies and stores information identifying the originator of a recording request. The identifying information may then be presented to a user to identify the origin of a recording timer or a recorded file.

18 Claims, 6 Drawing Sheets

SYSTEMS AND METHODS FOR MANAGING AND IDENTIFYING THE ORIGIN OF FILES ON A DIGITAL VIDEO RECORDER

BACKGROUND

Digital video recorders (DVRs) allow users to store television programs, movies and other content for archival and subsequent viewing. The capacity of recording mediums of some DVRs allows for the storage of hundreds of hours of content which changes on a daily basis as users delete various events and request recording of new events by the DVR. In a multi-user environment, such as a family, an event that may have previously been set to record may conflict with the needs and requirements of timers that another user now desires for recording other events. For example, two events may require the use of the same receiving resource (e.g., the same tuner at the same time). The question "Who recorded this event?" is a frequent conversation in multi-user homes. Similarly, events stored on a storage medium may be inconveniently large but may have an uncertain origin and importance. Sometimes, it is problematic for users to determine who recorded a particular event or whether the file associated with the event may be deleted, because the person who originally recorded the event is unknown.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the reception, processing and outputting of content from one or more sources for presentation to end-users. More particularly, the various embodiments described herein provide techniques for managing files on a DVR and the origin of such files. Techniques described herein allow a DVR to track the originator of a particular recording timer or recorded event. A DVR is configured to identify a user or external device that requests recording of a particular event. The identified information may be subsequently presented to a user to allow the user to ascertain the origination of the recording timer or a stored filed corresponding to a recorded event. In short, the various embodiments described herein provide systems, methods and apparatus for understanding the origin of recorded materials on a DVR.

In at least one embodiment, a DVR receives a first request to record a television program transmitted over a television distribution system. The DVR identifies an originator of the request and sets a recording timer to record the television program. The DVR associates the originator of the request with the recording timer. Subsequently, the DVR executes the recording timer and records the television program into a file. The DVR associates information identifying the originator with the stored file. The DVR subsequently receives a second request to view the identifying information associated with the file and outputs the identifying information for presentation to a user by an associated presentation device. Thus, the user may view the originator information and ascertain the origin of the recording.

Similarly, a user may request to view information related to a pending recording timer. Responsive to a request to view the recording timer information, the DVR may output information identifying the originator of the recording timer. Thus, the user may ascertain the origin of the recording timer based on the presented identifying information.

As used herein, originator may refer to both a user requesting to record an event as well as a device providing a recording request to the DVR. For example, in a family, the father may provide a request to the DVR to record a particular program. The DVR may identify the originator of the request as the father based upon an appropriate technique and store the originator as "Dad". In at least one embodiment, an external device, such as a communicatively coupled mobile telephone, place shifting device or computer may provide a recording request to the DVR. If the DVR is unable to ascertain the particular user providing the recording request, then the DVR may identify the originator as the external device providing the recording request. Thus, a user may utilize the originator information stored by the DVR to ascertain who recorded a particular television program.

Figure 1:
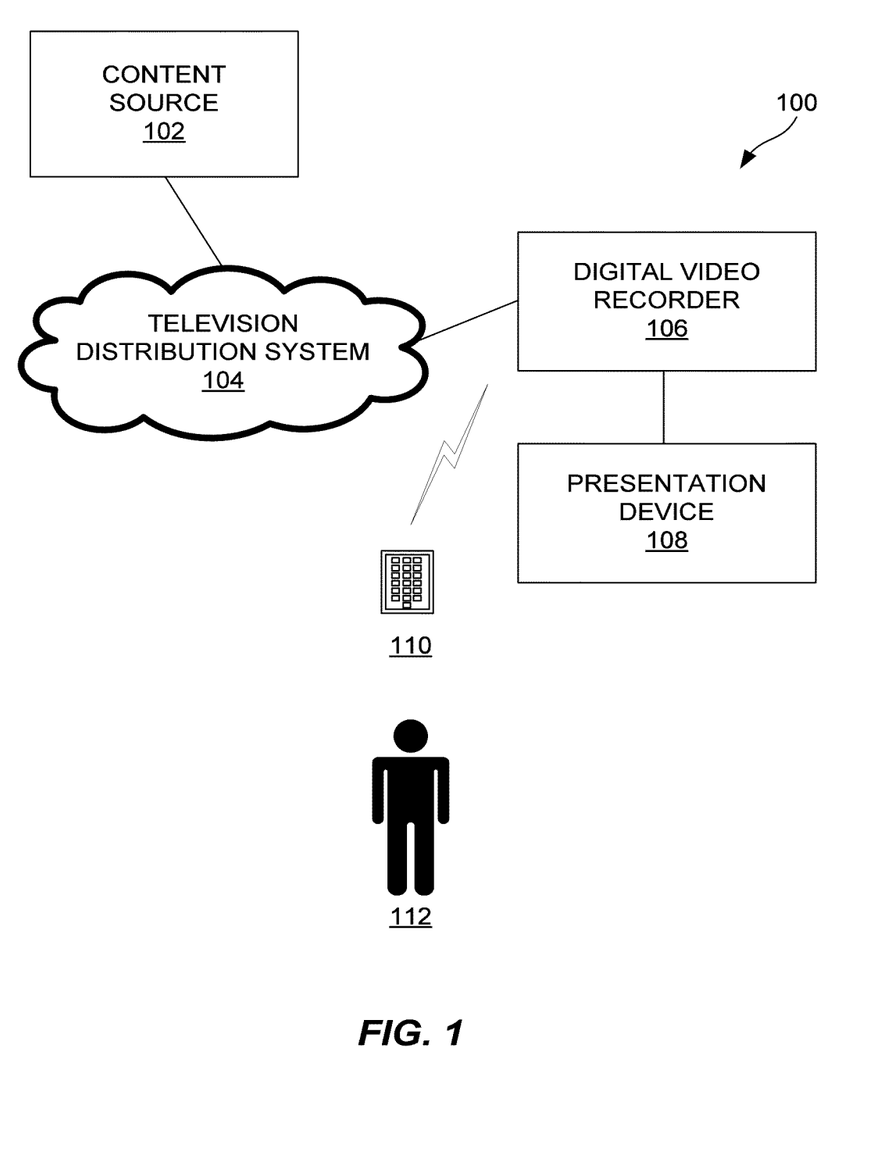
FIG. 1 illustrates an embodiment of a communication network.

FIG. 1 illustrates an embodiment of a communication network 100. The communication network includes a content source 102, a television distribution system 104, a DVR 106, a presentation device 108 and a remote control 110. Each of these components will be discussed in greater detail below. The communication network 100 may include other components, elements or devices not illustrated for the sake of brevity.

The content source 102 is operable for receiving, generating and communicating content to one or more DVRs 106. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the DVR 106 through the television distribution system 104. It is to be appreciated that the content source 102 may receive practically any form and/or type of information from one or more sources including streaming television programming, recorded audio or video, electronic programming guide data and the like.

The television distribution system 104 is operable to transmit content from the content source 102 to the DVR 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers, e.g., the DVR 106. The television distribution system 104 may also distribute content to a specific addressable television receiver, e.g., DVR 106, such as video-on-demand and the like. In at least one embodiment, the content source 102 may be embodied as a transmission facility of the television distribution system 104. Exemplary content sources 102 include over-the-air (OTA) terrestrial transmission facilities, cable television distribution headends, satellite television uplink centers, broadband or internet servers and the like.

The DVR 106 is operable to receive content from the television distribution system 104 and store the received content for subsequent presentation to the user 112. The DVR 106 is further operable to output the received and/or stored content for presentation by the presentation device 108. In at least one embodiment, the presentation device 108 is a display device (e.g., a television) configured to display content to a user 112. The DVR 106 may receive an audio/video stream in any format (e.g., analog or digital format), and store and output the audio/video stream for presentation by the presentation device 108. In at least one embodiment, the DVR 106 may be integrated with a television receiver, such as a satellite, cable, over-the-air, broadband or other type of television receiver that receives and demodulates television signals that are outputted for display on a display device (e.g., a television). As used herein, a television receiver or DVR may also be referred to as a set-top box, which is a television receiver that is located externally with respect to a display device. The DVR 106 may be further configured to output menus and other information that allow a user 112 to control the output of audio/video content by the DVR 106, view electronic programming guides (EPGs), set recording timers and the like. In some embodiments, the DVR 106 and the presentation device 108 may be integrated as a device combining the functionality of a display device and television receiver/DVR or the like.

Responsive to particular recording timers, the DVR 106 coordinates the reception of video signals associated with a television program through a television receiving resource (e.g., a television tuner) and storage of the video signal onto a storage medium (e.g., a hard drive or Flash memory). The DVR 106 may include any number of television receiving resources utilized for receiving television programs. A DVR 106 minimally includes at least one television receiving resource to receive and record video signals associated with a television program. The DVR 106 may include multiple television receiving resources to record multiple television programs simultaneously. For example, the DVR 106 may include two or more tuners that allow recording and/or viewing of multiple programs though the DVR 106 simultaneously. In at least one embodiment, the DVR 106 may include multiple types of television receiving resources, such as an over-the-air (OTA) tuner and a satellite and/or cable television tuner that may be utilized to receive and/or record programs from multiple sources.

To set a recording timer, the user 112 provides information to the DVR 106 identifying the program to be recorded. For example, the user 112 may identify the program title, the channel number or network, the time and the duration of the program. In at least one embodiment, the user 112 selects a program to be recorded using an electronic programming guide that lists various programming in a list or grid format. The DVR 106 receives the user input and sets an appropriate recording timer. In some embodiments, a recording timer may cause the DVR 106 to record multiple events, such as multiple episodes of a particular television program.

In accordance with techniques described herein, the DVR 106 identifies an originator of the recording request and associates the originator with the recording timer. For example, a user 112 may set a recording timer and provide their name, via a drop down selection menu or via a text entry field of an electronic programming guide. In at least one embodiment, a user 112 may log in to access features of the DVR 106 (e.g., via password/pin number, biometric identification or the like) and the DVR 106 may identify the originator of the request automatically based on the user 112 currently logged into the device. In at least one embodiment, a DVR 106 may be associated with multiple remote controls 110 in different rooms and each remote control may be associated with a particular user. Thus, the DVR 106 may identify the originator of the request based on the remote control 110 utilized to provide the recording request. For example, a child may have a separate remote control in their room that is utilized to remotely control a video feed to the child's room from the DVR 106. Thus, the child may be identified as the originator of the recording by the DVR 106 if the recording request is received from that particular remote control.

A user 112 may also utilize external devices, such as mobile telephones, personal digital assistants (PDAs) or computers to transmit recording requests to the DVR 106. If an external device is associated with a particular user, then the DVR 106 may be able to identify the user as the originator of the request. Otherwise, if the DVR 106 is not able to identify the user originating the request, then the DVR 106 may identify the external device as the originator of the request. In at least one embodiment, the DVR 106 may also associate other information with the recording timer, such as the origination time/date of the recording request.

Responsive to a particular recording timer, the DVR 106 receives and records the associated content into a file. The DVR 106 is also operable to associate information identifying the originator with the file. For example, metadata describing the content may also specify who requested recording of the program and/or when the request to record the program was received by the DVR 106.

Subsequently, the user 112 may desire to view metadata associated with the file and may select an option to view the same via a graphical user interface. Responsive to the request, the DVR 106 outputs the metadata associated with the file. Thus, the user 112 is presented with the identifying information regarding the originator of the recording request for the file.

Figure 2:
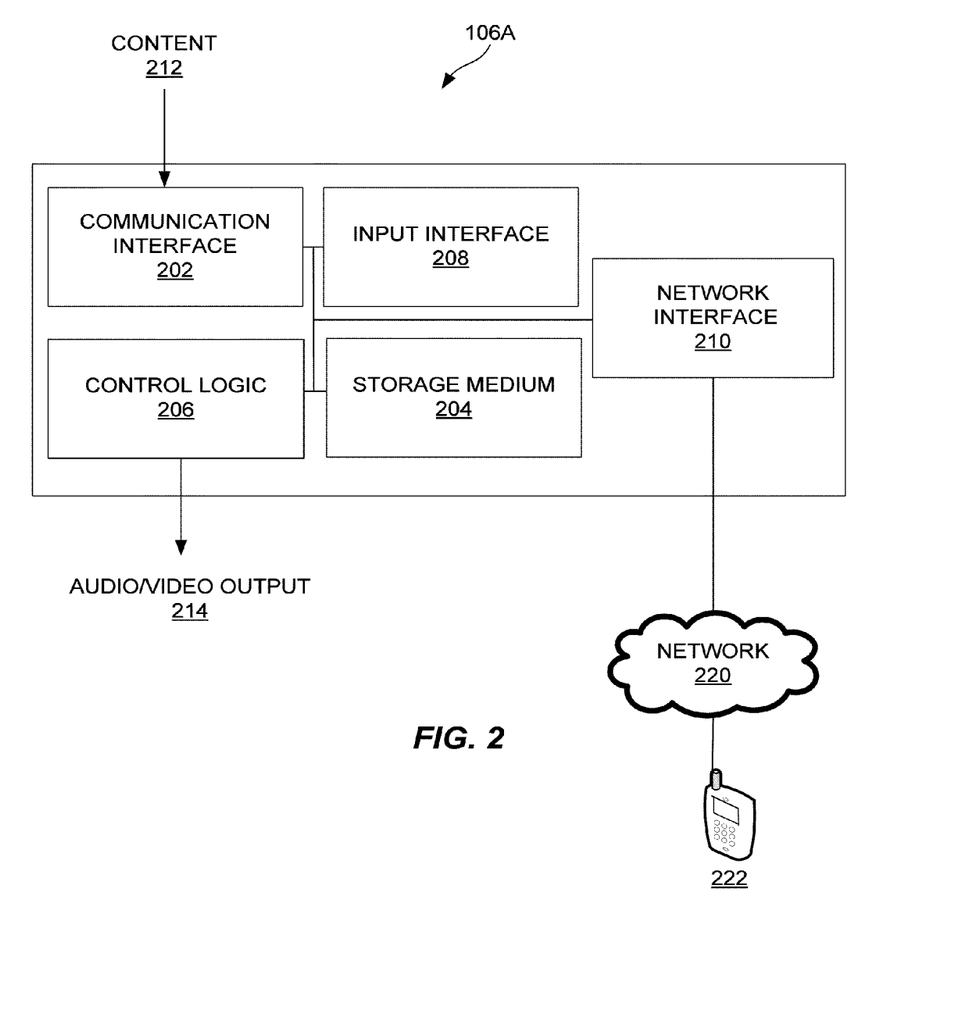
FIG. 2 illustrates an embodiment of a DVR of FIG. 1.

FIG. 2 illustrates an embodiment of a DVR 106A of FIG. 1. FIG. 2 will be discussed in reference to the communication network 100 illustrated in FIG. 1. The DVR 106A includes a communication interface 202, a storage medium 204, control logic 206, an input interface 208 and a network interface 210. Each of these components will be discussed in greater detail below. The DVR 106A may include other elements, components or devices which are not illustrated for the sake of brevity.

The communication interface 202 is operable to receive content 212 from the television distribution system 104. More particularly, in at least one embodiment, the communication interface 202 receives and tunes a television signal including television programming. The communication interface 202 may receive an over-the-air (OTA) broadcast, a direct broadcast satellite signal, a cable television signal or an internet protocol television (IPTV) signal and tune the content 212 to extract the selected television programming. In at least one embodiment, the communication interface 202 may comprise multiple tuners, utilized by the DVR 106A to output and/or record multiple television programs simultaneously.

The storage medium 204 is operable to persistently store video signals recorded by the DVR 106A. The storage medium 204 may also store other data, such as metadata associated with the recorded video signals. The storage medium 204 may comprise any type of non-volatile memory appropriate for storing video signals recorded by the DVR 106A. Exemplary storage mediums 204 include hard drives (e.g., magnetic memory), flash memory, battery backed up memory and the like. In at least one embodiment, the storage medium 204 may be internally located within the DVR 106A. In other embodiments, the storage medium 204 may be located external with respect to the DVR 106A. The DVR 106A may also utilize a combination of internal and external storage mediums 204 for storage of video signals.

The input interface 208 is operable to wirelessly receive data from a remote control 110 (see FIG. 1). The input interface 208 may communicate with a remote control utilizing any type of IR or RF communication link. In at least one embodiment, the input interface 208 receives a key code from a remote control 110 and responsively provides the key code to the control logic 206 for processing. The data received from the remote control 110 may be utilized by the control logic 206 to control the output of content by the control logic 206. In at least one embodiment, the input interface 208 may also receive data from other devices besides the remote control 110, such as a mobile telephone or personal digital assistant. For example, a mobile telephone may include an application allowing the mobile telephone to remotely control the DVR 106 similarly to the remote control 110.

The control logic 206 is operable to control the operation of the DVR 106A. The control logic 206 may be a single processing device or a plurality of processing devices that cooperatively operate to control the operation of the DVR 106A. The control logic 206 may include various components or modules for processing and outputting audio/video content. Exemplary components or modules for processing audio/video content include a demodulator, a decoder, a decompressor, a conditional access module and a transcoder module.

The control logic 206 coordinates storage of the content 212 onto the storage medium 204. More particularly, the control logic 206 operates responsive to recording timers configured on the DVR 106A to command the communication interface 202 to receive content from a specified channel and coordinates storage of the content onto the storage medium 204.

In at least one embodiment, the control logic 206 is operable to generate an audio/video output 214 based on the content 212, e.g., pass through the signal for display by an associated presentation device 108. The control logic 206 is also operable to retrieve stored video content from the storage medium 204 to generate an audio/video output 214 for display by the presentation device 108. The presentation device 108 then presents the audio/video output 214 to the user. The control logic 206 may incorporate circuitry to output the audio/video streams in any format recognizable by the presentation device 108, including composite video, component video, Digital Visual Interface (DVI), High-Definition Multimedia Interface (HDMI), 1394 and WiFi (e.g., streaming digital video over an internet connection). The control logic 206 may also incorporate circuitry to support multiple types of these or other audio/video formats. In at least one embodiment, as described above, the DVR 106A may be integrated with the presentation device 108, and the control logic 206 may be operable to control the presentation of the audio/video output 214 by the presentation device 108.

To coordinate the storage of the content 212, the control logic 206 is operable to receive user input requesting to record one or more television programs. For example, the user 112 may utilize the remote control 110 to select a program for recording via an electronic programming guide. Responsive to the user input requesting to record the program, the control logic 206 identifies an originator of the recording request. For example, a user 112 may provide identifying information in association with the request.

Figure 3:
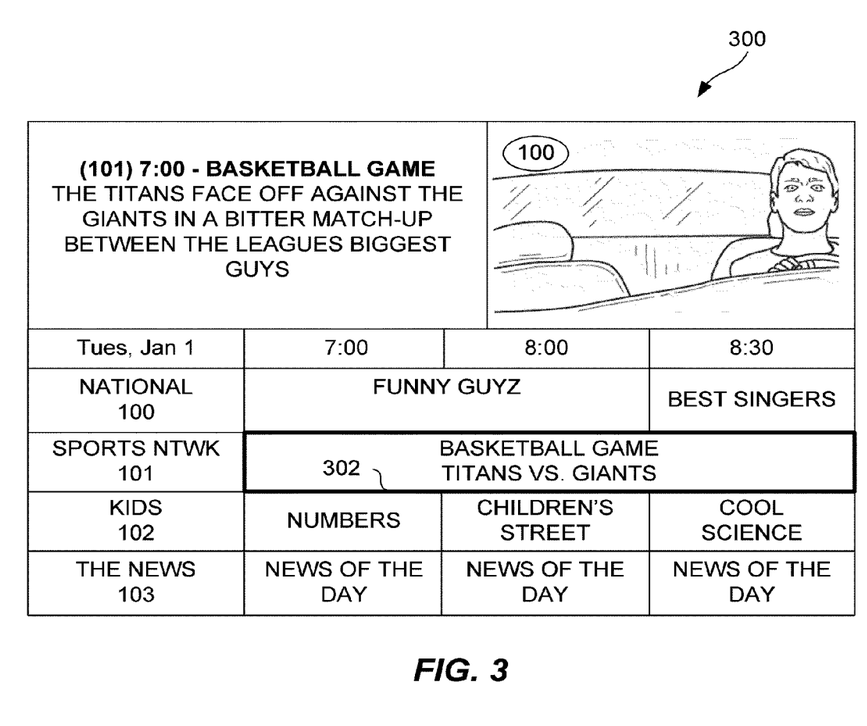
FIG. 3 illustrates an embodiment of an electronic programming guide outputted by the DVR of FIG. 2.

FIG. 3 illustrates an embodiment of an electronic programming guide 300 outputted by the DVR 106A of FIG. 2. The electronic programming guide 300 includes a grid presenting a plurality of programs available for viewing across multiple channels in multiple time slots. In at least one embodiment, a user 112 (see FIG. 1) utilizes a cursor 302 to select an upcoming program for recording. In the illustrated embodiment of FIG. 3, the user 112 highlights the basketball game for recording and the control logic 206 generates a pop-up menu 400, as illustrated in FIG. 4, soliciting additional information from the user regarding the recording timer.

Figure 4:
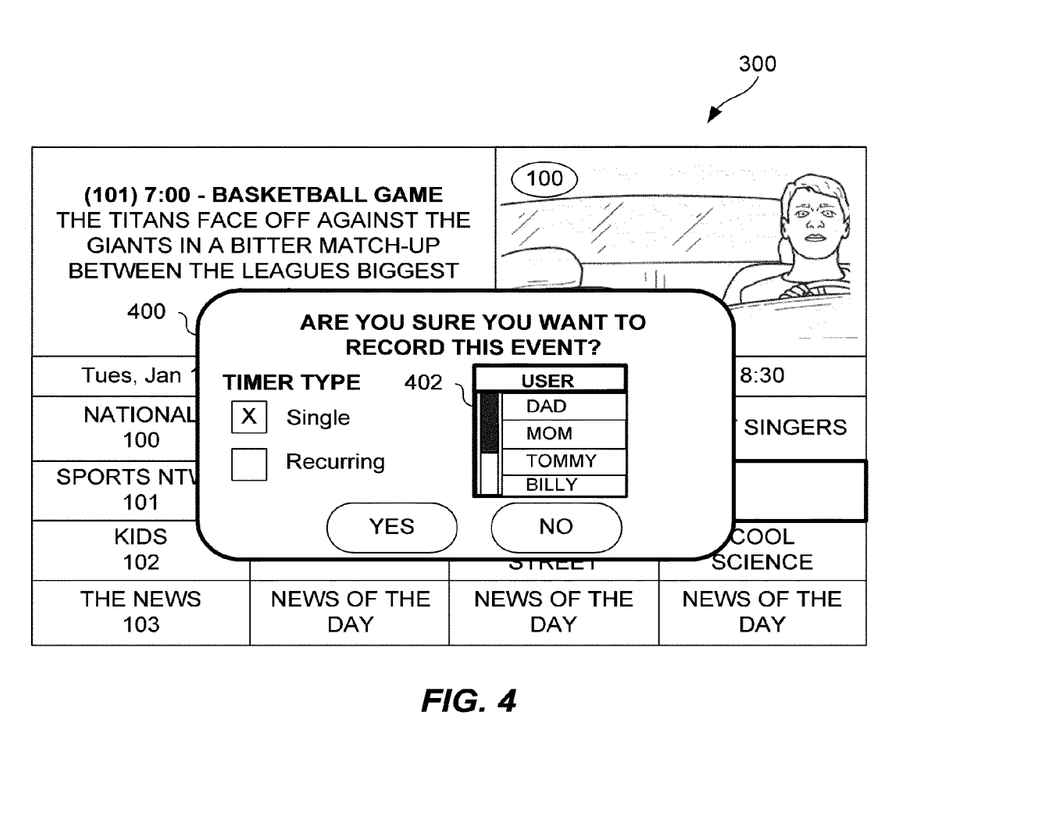
FIG. 4 illustrates an embodiment of a pop-up screen outputted by the DVR of FIG. 2.

As illustrated in FIG. 4, the pop-up menu 400 allows a user 112 (see FIG. 1) to identify themselves using the list box 402. It is to be appreciated that other data input techniques may also be utilized, such as a free-style text entry box or the like. Based upon the inputted data, the control logic 206 identifies the originator of the recording request, responsively sets a recording timer and associates the originator information with the timer for the event.

Figure 5:
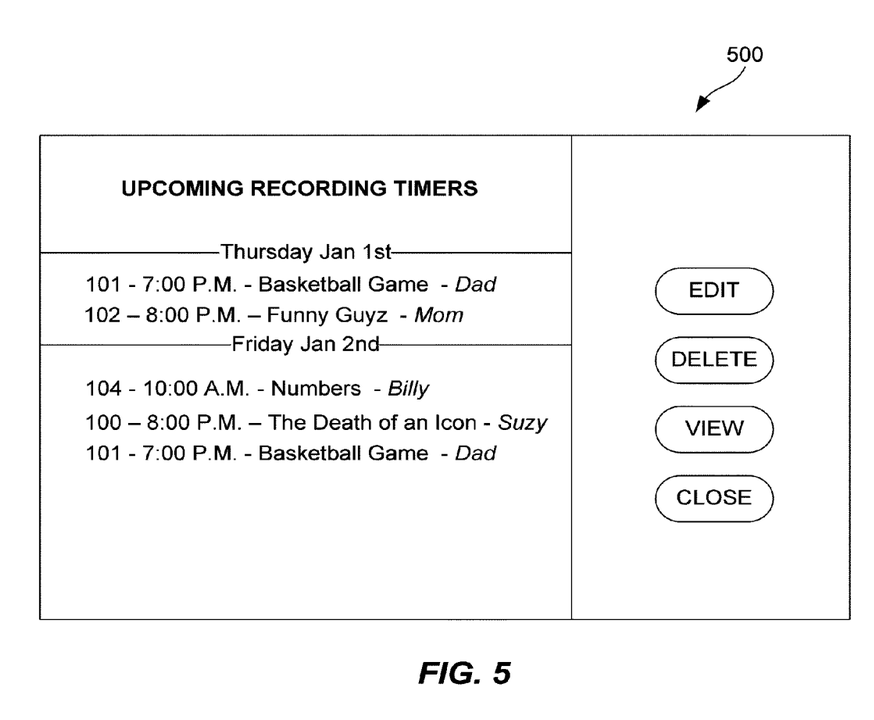
FIG. 5 illustrates an embodiment of a pending timers menu outputted by the DVR of FIG. 2.

In at least one embodiment, the originator information for pending recording requests may be outputted for presentation to a user 112. FIG. 5 illustrates an embodiment of a pending timers menu 500 outputted by the DVR 106A of FIG. 2. As illustrated in menu 500, each recording timer includes information identifying the originator of the request. For example, the "Basketball Game" events are associated with the user "Dad", whereas the "Funny Guyz" event is associated with the user "Mom". Likewise, the "Numbers" event is associated with the user "Billy" and the "Death of an Icon" event is associated with the user "Suzy". While the originator information is presented in the main pending timers menu in the illustrated embodiment, it is to be appreciated that the information may alternatively be displayed in an extended display menu accessed by highlighting one of the timers illustrated in FIG. 5.

Returning to FIG. 2, responsive to the recording timers, the control logic 206 coordinates the recording of the content 212 into a file of the storage medium 204. The control logic 206 is also operable to associate identifying information regarding the originator of the recorded event with the recorded file. The originator information may then be presented in association with the file metadata similarly to FIG. 5. For example, the control logic 206 may generate a list of files available for viewing and the list of files may include information identifying the originator of the recording (e.g., the user that requested storage of the file).

In at least one embodiment, the originator information is outputted by the control logic 206 in an extended data viewing screen. For example, a user 112 may request to view extended event information regarding a recording, e.g., a description of the program and the originator information may be presented in association therewith. It is to be appreciated that other possibilities for presenting the originator information may be utilized in accordance with the management techniques described herein.

Returning to FIG. 2, the DVR 106A may include an optional network interface 210 connected to a communication network 220. The network interface 210 provides bi-directional data transmission between the DVR 106A and other devices on the communication network, such as mobile telephones, personal digital assistants, place shifting devices, computers and the like. For example, a user 112 may remotely access the DVR 106A using any type of external device 222 to set recording timers, manage recorded files or access live or recorded content.

The network interface 210 may operate using any implementation of protocols or other features to support communication by the DVR 106A on an appropriate communication network 220. In various embodiments, network interface 210 supports conventional local area network (LAN), wide area network (WAN) or other protocols (e.g., the TCP/IP or UDP/IP suite of protocols widely used on the internet) to allow the DVR 106A to communicate on the communication network 220 as desired. Network interface 210 typically interfaces with the communication network 220 using any sort of LAN adapter hardware, such as a conventional network interface card (NIC) or the like provided within television receiver DVR 106A.

As described above, a user 112 may utilize the external device 222 to access the DVR 106A. For example, a user 112 may log into the DVR 106A using a computer located distally from the DVR 106A. Through the computer, the user 112 may perform various functions, such as setting a new recording timer. In at least one embodiment, the user 112 provides identifying information when accessing the DVR 106A via the external device 222. Thus, the control logic 206 may identify the user as the originator of a particular recording timer in accordance with the teachings above. Additionally, the control logic 206 may track information indicating that the recording request was provided via an external device 222, such as a mobile telephone or via a web accessible electronic programming guide.

However, if the control logic 206 is unable to identify the user, then the control logic may identify the device as the originator of the recording command. The device information may thus be presented in association with information regarding a recording timer or a recorded file. For example, a recorded event selection menu may specify that a file was recorded responsive to a timer set via a mobile telephone. Thus, even though the information does not explicitly specify who recorded the event, there is sufficient information for some users to ascertain the origin of the recording timer or the recorded file.

In at least one, the control logic 206 may be operable to maintain profiles associated with various users of the DVR 106A. For example, each family member may have a profile associated with the DVR 106A. In at least one embodiment, users may log in to access their profile using a password/pin number, biometric identification or the like. Different profiles may have varying access to features and content of the DVR 106A. For example, a parent may be able to access all programming received by the DVR 106A, whereas a child's access may be limited to kid friendly programming as designated by the parent. Similarly, each user may be restricted from accessing particular recorded content, depending on desired design criteria.

In at least one embodiment, recorded events may be associated with a particular user of the DVR 106A. For example, the recorded event may be associated with an originator of an event. If the user logs into the DVR 106A, then the originator of an event may be identified by the control logic 206 automatically based on which profile is currently logged into the DVR 106A.

The control logic 206 may also be operable to track whether the originator of the event has viewed the recorded file. For example, the control logic 206 may coordinate the storage of information identifying whether a user using the particular profile that originated the event has actually viewed the event. This information may then be outputted by the control logic 206 for presentation to users. Thus, one user may be able to ascertain whether it is acceptable to delete a recorded file depending on whether the originator of the event has already viewed the content.

The control logic 206 may determine whether a user has actually viewed an event in several ways. For example, after viewing a particular event, a user may provide input to the control logic 206 indicating that they have completed viewing an event. The control logic 206 may also track whether an entire event or some majority thereof (e.g., 80%) has been played back by the DVR 106A. If so, the control logic 206 may designate the event as being already viewed by the user 112 (see FIG. 1). In at least one embodiment, a partially played back event which has been locked for deletion by the originator is designated as not already viewed, since it is likely that the user has not viewed important portions of the content. It is to be appreciated that any combination of the appropriate techniques for determining whether a user 112 has viewed an event may be utilized as appropriate depending on desired design and operational criteria of the control logic 206.

In at least one embodiment, the control logic 206 may lock an unviewed event for deletion by users other than an originator of the event. For example, if a first user has requested recording of an event but has not yet viewed the recorded file, then the control logic 206 may prohibit a second user from deleting the event. In at least one embodiment, the control logic 206 unlocks the recorded file for deletion by the second user once the first user has viewed the event. Thus, the DVR 106A may protect recorded events against inadvertent deletion by other users.

Often it is the case that multiple users may have an interest in the same programming but may not watch the program together. Typically, one user creates a recording timer to record the programming which is available for all users. However, it may be desirable that content cannot be deleted until each interested user has viewed the content. Thus, in some embodiments, a recorded event may be associated with multiple users and may be blocked from deletion until each associated user has viewed the recording. For example, the DVR 106A may have four users (A, B, C and D) and user A may create a recording timer for an event. Further, the recorded event may be associated with users A and D. Thus, until both users A and D have viewed the recording, then other users may be unable to delete the event. This can be contrasted with the situation in which a recorded event is locked from deletion until the originator of the recording has viewed the event, which may result in an event being deleted before another interested user has viewed the content.

In at least one embodiment, a user may initially set up a recording and may indicate particular viewers that should be associated with the recorded event. For example, user A may record a program and believe that user C may have an interest in the program as well. Thus, user A may also associate the recording with user C during the timer set up process. In at least one embodiment, the DVR 106A may provide a menu process that allows users to disassociate themselves for a recording. For example, user C may not actually have an interest in the program and may thus desire to be dissociated with the event such that the event can be deleted without user C previously viewing the event.

In other scenarios, a user may be associated with an event after a recording timer has been set or an event has been recorded. For example, user A may request to record a particular event and user B may subsequently see the pending recording timer or the recorded event and may desire to register an interest in the program. User C may thus provide input via an appropriate menu in order to register their interest in the program.

Figure 6:
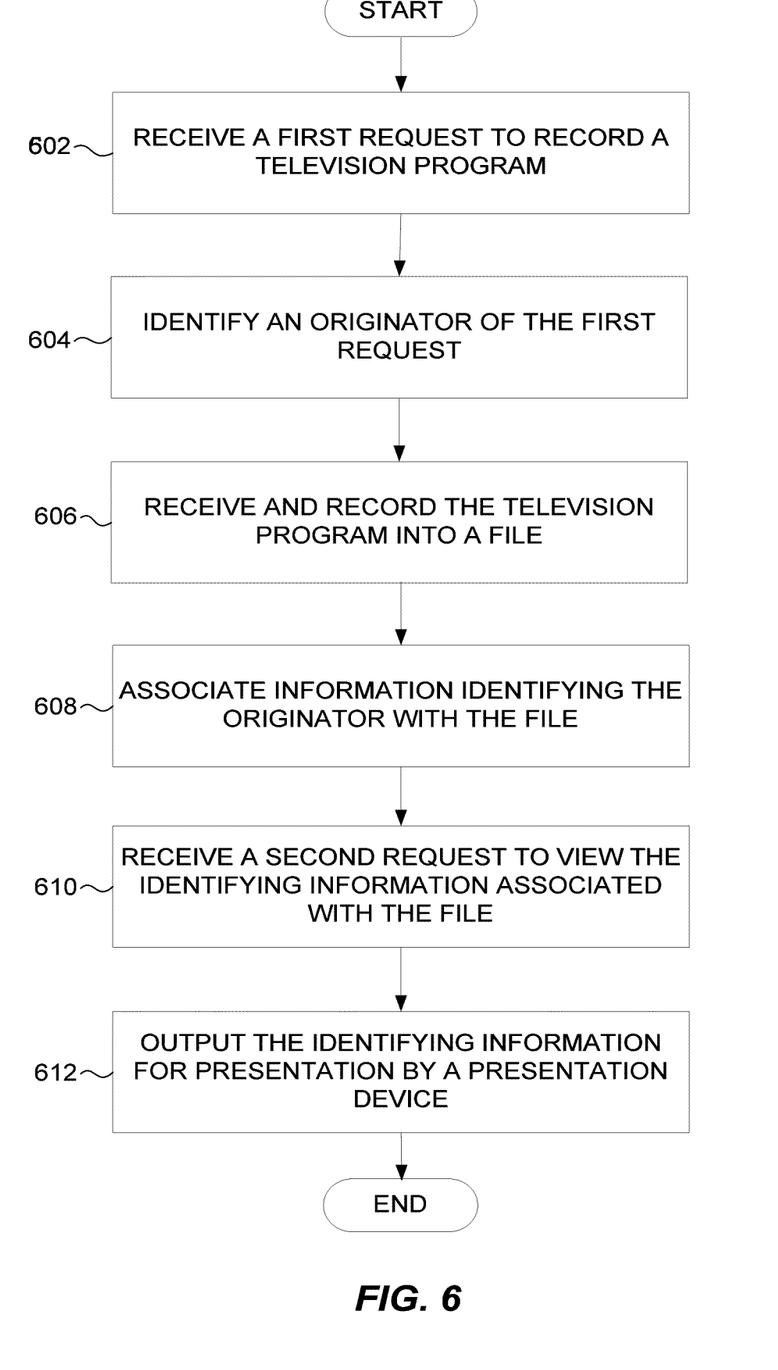
FIG. 6 illustrates an embodiment of a process for recording television content.

FIG. 6 illustrates an embodiment of a process for recording television content. More particularly, FIG. 6 illustrates a process for managing files associated with recorded content on any type of DVR, including set-top box DVRs, whole home DVRs or network DVRs. The process of FIG. 6 may include other operations not illustrated for the sake of brevity.

The process includes receiving a first request to record a television program transmitted over a television distribution system (operation 602). The process further includes identifying an originator of the first request (operation 604). For example, a user may provide input, via a remote control, requesting to record a particular program. A user may additionally provide input identifying themselves to the DVR 106A.

The process further includes receiving and recording the television program into a file (operation 606). The process further includes associating information identifying the originator with the file (operation 608). For example, a DVR may store metadata describing the recorded file and the metadata may include information identifying the originator of the recording request associated with the recorded file.

The process further includes receiving a second request to view the identifying information associated with the file (operation 610). For example, a user may desire to view extended event information, e.g., a description of the television program and the like via a graphical user interface. Responsive to the request, the process further includes outputting the identifying information for presentation by a presentation device (operation 612).

Although specific embodiments were described herein, the scope of the invention is not limited to those specific embodiments. The scope of the invention is defined by the following claims and any equivalents therein.

I claim:

1. A method for recording television content, the method comprising:
   receiving a first request, at a digital video recorder, to record a television program transmitted over a television distribution system;
   determining whether an originator of the first request is identifiable and, if such determination is made in the affirmative, identifying the originator, and, if such determination is made in the negative, identifying an originating device of the first request;
   receiving and recording the television program into a file at the digital video recorder;
   upon a condition in which an originator of the first request is identified, associating information identifying the originator with the file at the digital video recorder;
   upon a condition in which an originating device of the first request is identified, determining whether the originating device is associated with an originator;
      upon a condition in which the originating device is associated with an originator, associating information identifying the originator with the file at the digital video recorder;
      upon a condition in which the originating device is not associated with an originator, associating information identifying the originating device with the file at the digital video recorder;
   receiving a second request, through the digital video recorder, to view the identifying information associated with the file;
   outputting the identifying information, from the digital video recorder, for presentation by a presentation device, responsive to the second request;
   receiving a third request, through the digital video recorder, to register an interest in the television program by a second user other than the originator, thereby additionally identifying the second user with the file at the digital video recorder;
   receiving a fourth request, through the digital video recorder, to delete the file, wherein:
      if the fourth request is received from the originator, the method comprises deleting the file;
      if the fourth request is received from a user other than the originator, the method comprises: determining whether both the original and the second user have viewed the television program, and, if the determination is made in the affirmative, deleting the file, but if the determination is made in the negative, prohibiting the file from being deleted.

2. The method of claim 1, wherein the identifying information comprises a user of the digital video recorder that requested to record the television program.

3. The method of claim 2, wherein identifying the originator of the first request further comprises:
   receiving user input, in association with the first request, at the digital video recorder, the user input identifying the user.

4. The method of claim 2, wherein identifying the originator of the first request further comprises:
   identifying the user logged into the digital video recorder.

5. The method of claim 2, further comprising:
   determining whether the user has viewed the file; and
   outputting a message, in association with the identifying information, the message specifying whether the user has viewed the file.

6. The method of claim 1, wherein the originator of the first request comprises an external device, communicatively coupled to the digital video recorder through a communication network, that provided the first request to the digital video recorder.

7. The method of claim 1, wherein identifying the originator of the first request further comprises:
   identifying one of a plurality of remote controls associated with the digital video recorder that transmitted the first request.

8. The method of claim 1, further comprising identifying a plurality of originators associated with the first request and associating information identifying the plurality or originators with the file at the digital video recorder.

9. An apparatus comprising:
   an input interface operable to receive a first request to record a television program;
   a storage medium;
   a communication interface that receives the television program; and
   a processor comprising control logic that performs the following operations:
      identify an originator and an originating device of the first request;
      coordinate storage of the television program in a file on the storage medium;
      associate information identifying the originator with the file;
      associate information identifying the originating device with the file at the digital video recorder;
      receive a second request to view the identifying information of the originator and the originating device associated with the file;
      output the identifying information of the originator and the originating device for presentation by a presentation device receive a third request, through the digital video recorder, to register an interest in the television program by a second user other than the originator, thereby additionally identifying the second user with the file at the digital video recorder;

receive a fourth request, through the digital video recorder, to delete the file, wherein:

if the fourth request is received from the originator, the control logic deletes the file;

if the fourth request is received from a user other than the originator, the control logic: determines whether both the original and the second user have viewed the television program, and, if the determination is made in the affirmative, deletes the file, but if the determination is made in the negative, prohibits the file from being deleted.

10. The apparatus of claim 9, wherein the control logic is identifies a user that requested to record the television program.

11. The apparatus of claim 10, wherein the control logic provides a user interface to solicit user input, in association with the first request, the user input identifying the user.

12. The apparatus of claim 10, wherein the control logic identifies a user logged into the apparatus and associate the user with the file during recording of the television program.

13. The apparatus of claim 9, wherein the input interface receives the first request from an external device, communicatively coupled to the apparatus through a communication network and the control logic identifies the originator based on the external device.

14. The apparatus of claim 13, wherein the information identifying the originator specifies the external device.

15. The apparatus of claim 13, wherein the information identifying the originator specifies a user of the external device.

16. The apparatus of claim 13, wherein the input interface communicates with a plurality of remote controls and wherein the control logic identifies the originator based on one of the plurality of remote controls that transmits the request to the apparatus.

17. The apparatus of claim 9, wherein the control logic determines whether the originator has viewed the file and output a message, in association with the identifying information, the message specifying whether the originator has viewed the file.

18. A method for recording television content, the method comprising:

receiving a first request, at a digital video recorder, to record a television program transmitted over a television distribution system;

identifying an originating device of the first request;

receiving and recording the television program into a file at the digital video recorder;

determining whether the originating device is associated with an originator;

upon a condition in which the originating device is associated with an originator, associating information identifying the originator with the file at the digital video recorder;

upon a condition in which the originating device is not associated with an originator, associating information identifying the originating device with the file at the digital video recorder;

receiving a second request, through the digital video recorder, to view the identifying information associated with the file;

outputting the identifying information, from the digital video recorder, for presentation by a presentation device, responsive to the second request receiving a third request, through the digital video recorder, to register an interest in the television program by a second user other than the originator, thereby additionally identifying the second user with the file at the digital video recorder;

receiving a fourth request, through the digital video recorder, to delete the file, wherein:

if the fourth request is received from the originator, the method comprises deleting the file;

if the fourth request is received from a user other than the originator, the method comprises: determining whether both the original and the second user have viewed the television program, and, if the determination is made in the affirmative, deleting the file, but if the determination is made in the negative, prohibiting the file from being deleted.

* * * * *